United States Patent [19]
Stevens, III

[11] Patent Number: 6,031,585
[45] Date of Patent: *Feb. 29, 2000

[54] ELECTRONIC PRICE LABEL COMPRISED OF A LIQUID CRYSTAL DISPLAY WITH POLARIZERS PERPENDICULAR TO EACH OTHER CREATING A WIDE VERTICLE VIEWING ANGLE

[75] Inventor: Harden E. Stevens, III, Lexington, S.C.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/085,930

[22] Filed: May 28, 1998

[51] Int. Cl.[7] .................. G02F 1/1335; G02F 15/00; G02F 1/13
[52] U.S. Cl. .................... 349/1; 235/383; 349/96
[58] Field of Search .................. 349/96, 58, 1; 235/383, 375

[56] References Cited

U.S. PATENT DOCUMENTS

| | | | |
|---|---|---|---|
| 4,002,886 | 1/1977 | Sundelin | 235/383 |
| 4,500,880 | 2/1985 | Gomersall et al. | 340/825.35 |
| 4,924,363 | 5/1990 | Kornelson | 362/125 |
| 5,172,314 | 12/1992 | Poland et al. | 705/1 |
| 5,448,226 | 9/1995 | Failing, Jr. et al. | 340/825.35 |
| 5,600,462 | 2/1997 | Suzuki et al. | 349/112 |
| 5,640,216 | 6/1997 | Hasegawa et al. | 349/58 |
| 5,729,307 | 3/1998 | Koden et al. | 349/33 |
| 5,751,453 | 5/1998 | Baur | 349/12 |
| 5,825,441 | 10/1998 | Hornell et al. | 349/77 |

*Primary Examiner*—William L. Sikes
*Assistant Examiner*—Heidi L. Eisenhut
*Attorney, Agent, or Firm*—Paul W. Martin; Peter H. Priest

[57] ABSTRACT

An electronic price label which produces a wider vertical viewing angle than previous electronic price labels for improved reading of prices at different shelf heights. The electronic price label includes a liquid crystal display for displaying character information, including price information, along a substantially horizontal direction. The liquid crystal display includes a number of polarizers which produce a maximum vertical viewing angle and a maximum horizontal viewing angle, wherein the maximum vertical viewing angle is greater than the maximum horizontal viewing angle.

10 Claims, 3 Drawing Sheets

ELECTRONIC PRICE LABEL COMPRISED OF A LIQUID CRYSTAL DISPLAY WITH POLARIZERS PERPENDICULAR TO EACH OTHER CREATING A WIDE VERTICLE VIEWING ANGLE

BACKGROUND OF THE INVENTION

The present invention relates to electronic price label (EPL) systems, and more specifically to an EPL including a liquid crystal display (LCD) with a wide vertical viewing angle.

EPL systems typically include a plurality of EPLs for each merchandise item in a store. EPLs include displays which display the price of corresponding merchandise items on store shelves and are typically attached to a rail along the leading edge of the shelves. EPL systems typically obtain their prices from the POS server's PLU file. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

Displays in EPLs are typically liquid crystal displays, due to their low cost. Displays in EPLs are typically not backlit, which means that they must rely on ambient lighting to work. However, most stores use a minimum amount of ambient lighting in order to save cost.

LCDs include optical front and rear polarizers to optimize character display. In known EPLs, the polarizing direction of the front polarizer is horizontal and the polarizing direction of the rear polarizer is vertical. This arrangement provides a wide horizontal viewing angle. However, viewing angles change with changes in ambient lighting, as well as battery voltage and LCD construction.

LCD technology is discussed in U.S. Pat. No. 4,659,181, entitled "Liquid Crystal Displays And Method By Which Improved Apparent Viewing Cones Are Attained Therefor", to Mankedick et al. LCD technology is also discussed in Scientific American article "Working Knowledge, Active-Matrix Liquid-Crystal Displays", by Samuel Mesa, November, 1997, p. 124.

EPLs have traditionally been mounted to shelf edges at a single orientation regardless of shelf height. Since conventional polarizer orientations restrict the vertical viewing angle, a customer is capable of reading EPLs located at eye level, and finds increasing difficulty in reading EPLs on shelves above and below eye level. Variance of customer heights complicates the problem for a retailer.

Therefore, it would be desirable to provide an EPL including an LCD with wide vertical viewing angle to allow a customer to read EPLs at different shelf heights.

SUMMARY OF THE INVENTION

In accordance with the teachings of the present invention, an EPL including an LCD with a wide vertical viewing angle is provided.

The electronic price label includes a liquid crystal display for displaying character information, including price information, along a substantially horizontal direction. The liquid crystal display includes a number of polarizers which produce a maximum vertical viewing angle and a maximum horizontal viewing angle, wherein the maximum vertical viewing angle is greater than the maximum horizontal viewing angle.

In the preferred embodiment, the liquid crystal display includes a front polarizer for polarizing light in a generally vertical direction, and a rear polarizer for polarizing the light in a generally horizontal direction.

It is accordingly an object of the present invention to provide an EPL including an LCD with a wide vertical viewing angle.

It is another object of the present invention to provide an EPL display with an enhanced vertical viewing angle.

It is another object of the present invention to provide an EPL display which sacrifices horizontal viewing angle for an enhanced vertical viewing angle.

BRIEF DESCRIPTION OF THE DRAWINGS

Additional benefits and advantages of the present invention will become apparent to those skilled in the art to which this invention relates from the subsequent description of the preferred embodiments and the appended claims, taken conjunction with the accompanying drawings, in which:

DETAILED DESCRIPTION OF THE PREFERRED EMBODIMENT

Figure 1:
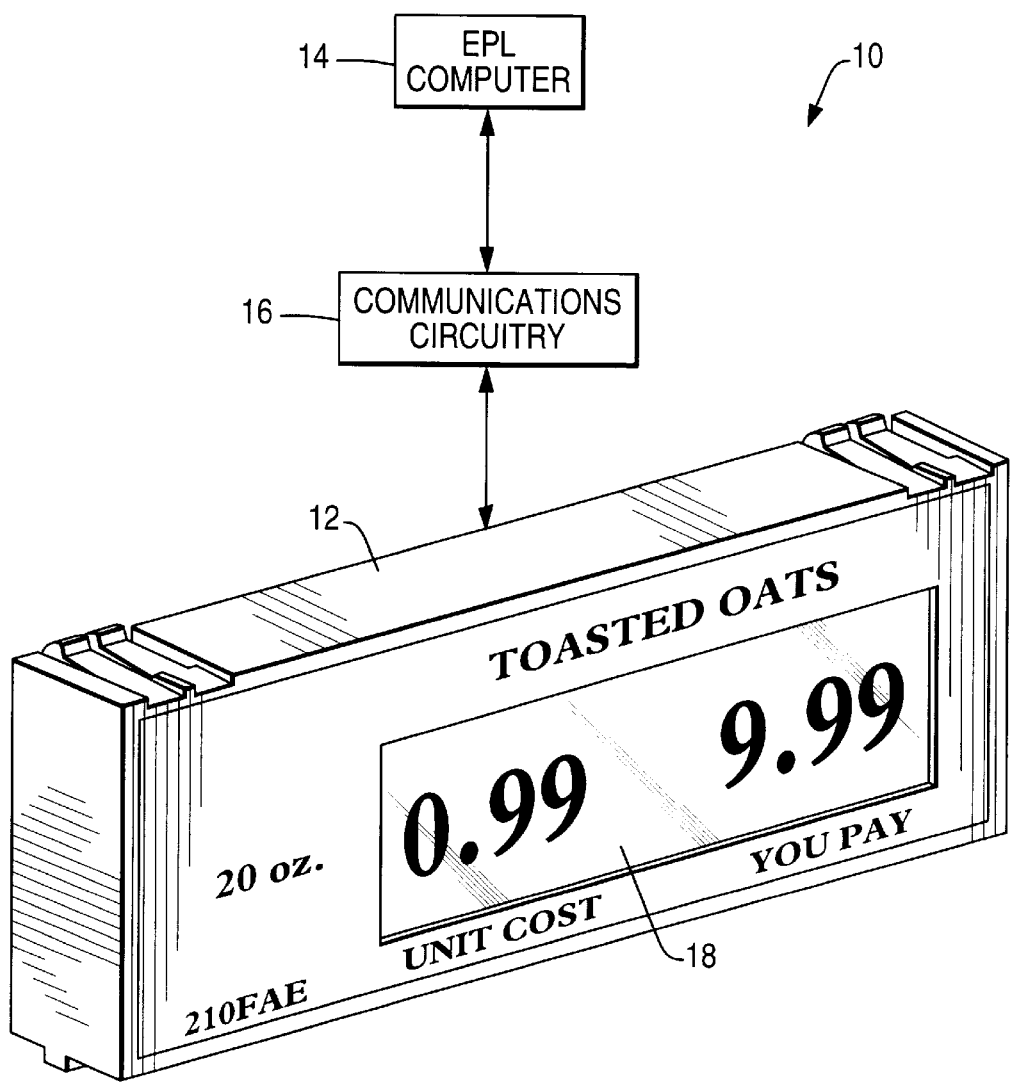
FIG. 1 is a diagram of an EPL system.

Referring now to FIG. 1, EPL assembly 10 includes EPL 12, EPL computer 14, and communications equipment 16.

EPL 12 includes liquid crystal display (LCD) 18. System 10 preferably includes a plurality of EPLs 12.

EPL computer 14 records, schedules, and transmits all messages to EPL 12 and receives and analyzes messages from EPL 12. For example, EPL computer 14 schedules and transmits price change messages which control the price displayed by EPL 12.

Communications equipment 16 provides communication services between EPL computer 14 and EPLs 12. Communication equipment 16 may provide wireless or wired communication between EPL computer 14 and EPLs 12. In wireless applications, communication equipment 16 typically includes either infrared (IR) or radio frequency (RF) transceivers.

Figure 2:
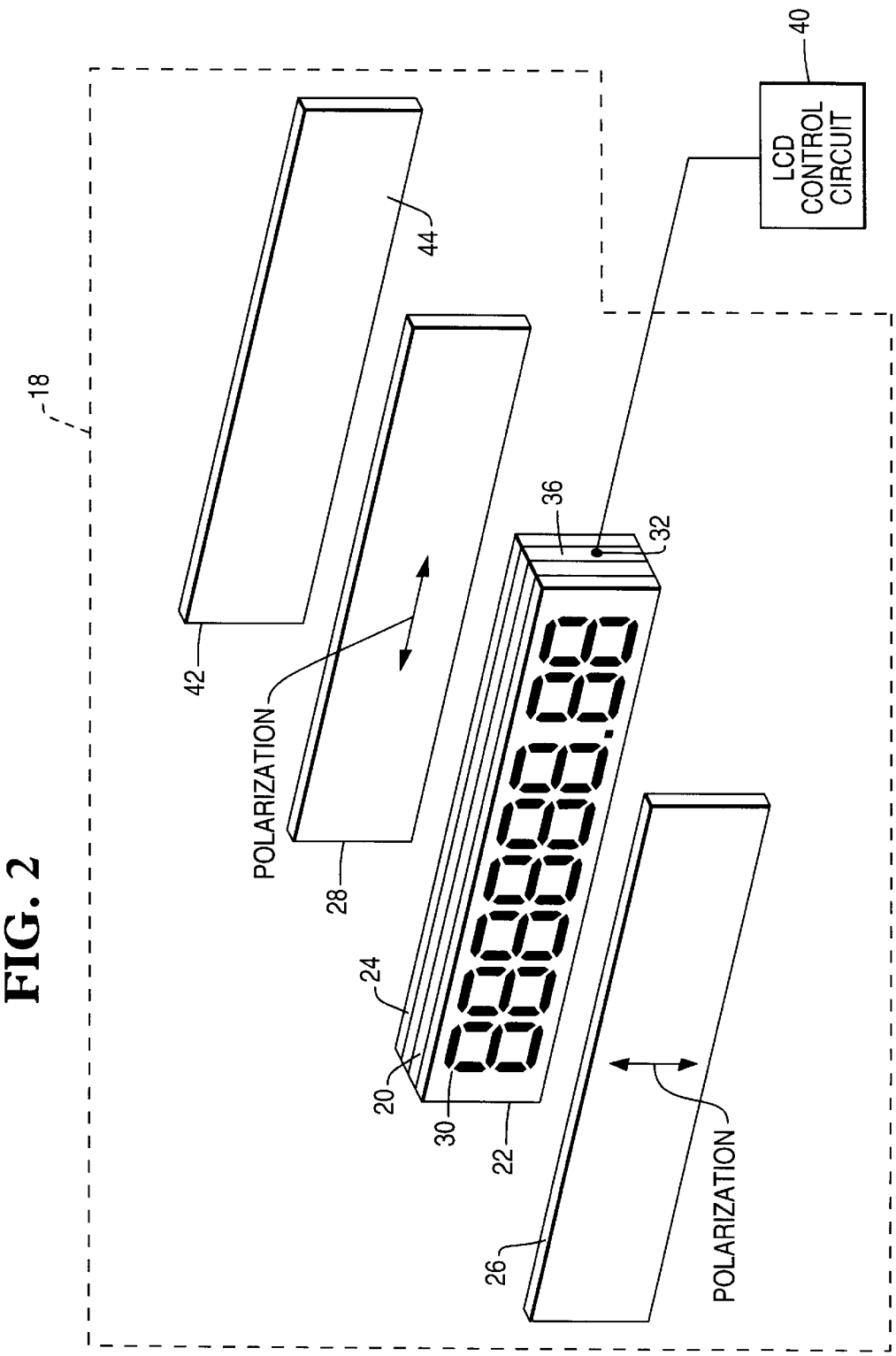
FIG. 2 is an exploded view of an LCD used within the EPL of the present invention.

Turning now to FIG. 2, LCD 18 includes a layer 20 of transparent liquid crystal material sandwiched between a pair of parallel optically transparent containment plates 22 and 24 which are preferably made of glass to allow light to pass through and to prevent damage to EPL 12.

Between layer 20 and the rear plate 24 is an electrode layer 36 which controls character display. Layer 36 includes row and column addressing lines which define pixel or sub-pixel areas of display 18. LCD control circuit 40 turns on the pixel and sub-pixel areas of display 18 to display price and promotional information from price control software executed by EPL computer 14.

The pair of plates 22 and 24 containing layer 20 are sandwiched between a pair of light polarizing sheets or polarizers 26 and 28. Polarizers 26 and 28 are typically implemented as coatings on the outside surfaces of glass plates 22 and 24. Unlike known LCDs in EPLs, the polarizing direction of front polarizer 26 is preferably vertical, while the polarizing direction of rear polarizer 28 is preferably horizontal.

LCD 18 also preferably a low cost display to keep the per unit cost of EPL 12 to a minimum. As such, it includes a reflective layer 42 having a reflective surface 44 for redirecting incoming ambient light back through LCD 18. However, the present invention still envisions LCDs that use backlighting.

LCD 18 displays character information in a generally horizontal direction. Therefore, LCD 18 has a width greater than its height.

Figure 3:
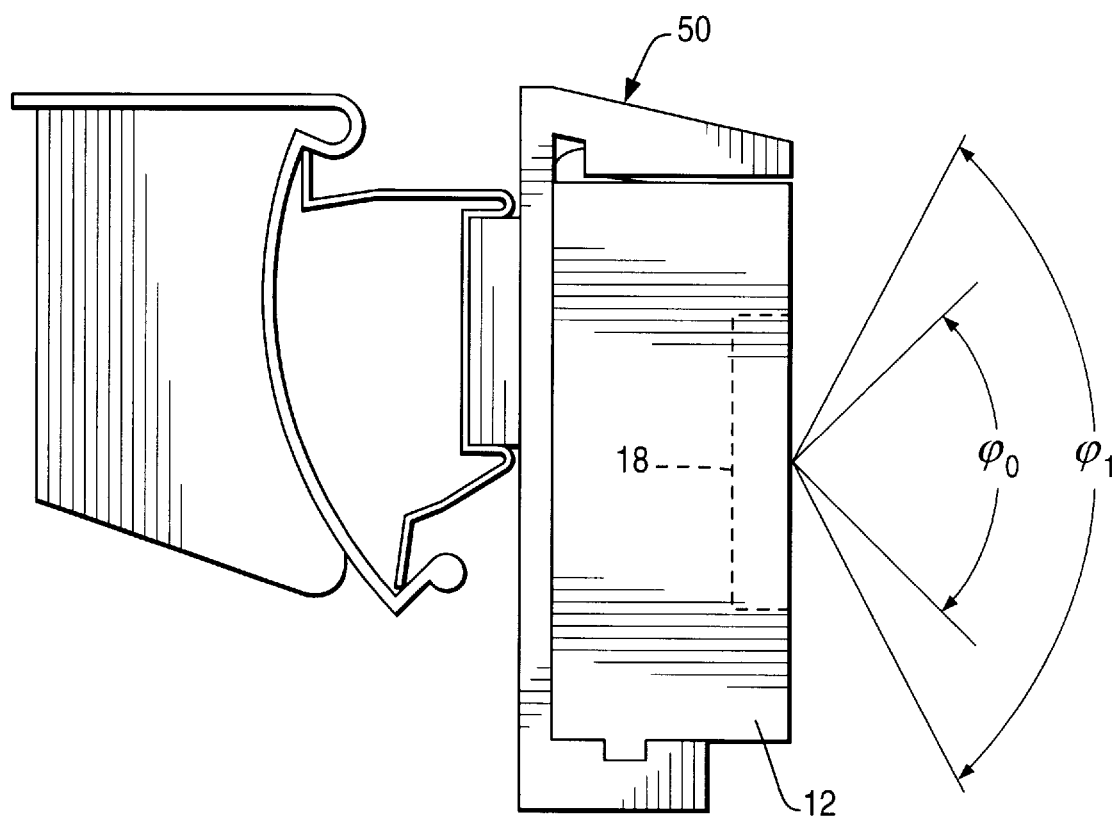
FIG. 3 is a diagram illustrating the increase in vertical viewing angle provided by the EPL of the present invention.

Turning now to FIG. 3, EPL 12 is shown mounted to a shelf assembly 50. Use of the present invention results in an increase in vertical viewing angle of up to about thirty degrees over a previous vertical viewing angle $\phi_0$ under lighting conditions similar to those of a typical retail store. Under such conditions, the new vertical viewing angle $\phi_1$ is about eighty to ninety degrees centered about a normal line to LCD 18. Horizontal viewing is restricted, but still sufficient to read neighboring EPLs on either side.

Although the present invention has been described with particular reference to certain preferred embodiments thereof, variations and modifications of the present invention can be effected within the spirit and scope of the following claims.

We claim:

1. An electronic price label adapted for use in an electronic price label system employing a plurality of electronic price labels mounted to shelf edges at different shelf heights, the electronic price label having a wide vertical viewing angle and comprising:

a liquid crystal display for displaying character information transmitted by an electronic price label computer, including price information, along a substantially horizontal direction including
      a front polarizer for polarizing light in a generally vertical direction, and
      a rear polarizer for polarizing the light in a generally horizontal direction, the front and the rear polarizer combined with a layer of liquid crystal material producing a maximum vertical viewing angle which is greater than a maximum horizontal viewing angle; and
   a liquid crystal control circuit to cause the liquid crystal display to display said character information.

2. An electronic price label comprising:

housing suitable for mounting to a shelf assembly;

a liquid crystal display within the housing for displaying character information, including price information transmitted by an electronic price label computer, along a substantially horizontal direction including
      a front polarizer for polarizing incoming light in a generally vertical direction;
      a first glass layer behind the front polarizer;
      a layer of liquid crystal material behind the first glass layer;
      an electrode layer behind the liquid crystal layer for making predetermined portions of the liquid crystal material corresponding to the displayed character information opaque when energized by a control voltage;
      a second glass layer behind the electrode layer;
      a rear polarizer behind the second glass layer for polarizing the light in a generally horizontal direction, the front and the rear polarizer combined with the layer of liquid crystal material producing a maximum vertical viewing angle greater than a maximum horizontal viewing area; and
      a reflecting layer behind the rear polarizer for reflecting the incoming light in an outgoing direction.

3. An electronic price label comprising:

a liquid crystal display for displaying character information transmitted by an electronic price label computer, including price information, along a substantially horizontal direction including
      at least a first and a second polarizer which combined with a layer of liquid crystal material produce a maximum vertical viewing angle and a maximum horizontal viewing angle, respectively;
      wherein the first polarizer is placed in front of the second polarizer and the maximum vertical viewing angle is greater than the maximum horizontal viewing angle; and
      a liquid crystal control circuit to cause the liquid crystal display to display said character information, including price information.

4. The electronic price label of claim 1 wherein the character information further comprises product promotional information.

5. The electronic price label of claim 1 wherein the liquid crystal display further comprises a back reflective layer having a reflective surface for redirecting incoming ambient light through the liquid crystal display.

6. The electronic price label of claim 1 wherein the electronic price label has a vertical viewing angle of about eighty to ninety degrees centered about a line normal to the liquid crystal display.

7. The electronic price label of claim 1 further comprising a pair of parallel optically transparent containment plates to allow light to pass through and to prevent damage to the electronic price label.

8. The electronic price label of claim 1 further comprising an electrode layer which controls character display.

9. The electronic price label of claim 8 wherein the electrode layer further comprises row and column addressing lines which define pixel or sub-pixel areas of the liquid crystal display.

10. The electronic price label of claim 1 further comprising a housing adapted for ready mounting to a shelf assembly for mounting the electronic price label to a shelf edge.

\* \* \* \* \*

UNITED STATES PATENT AND TRADEMARK OFFICE
CERTIFICATE OF CORRECTION

PATENT NO. : 6,031,585
DATED : February 29, 2000
INVENTOR(S) : Harden E. Stevens, III It is certified that error appears in the above-indentified patent and that said Letters Patent is hereby corrected as shown below:

Title Page, section [54], line 4, delete "WIDE".

Title Page, section [54], line 4, delete "VERTICLE" and substitute "VERTICAL".

Column 3, line 43, before "housing" insert --a--.

Signed and Sealed this

Fifteenth Day of May, 2001

Attest:

NICHOLAS P. GODICI

*Attesting Officer*   *Acting Director of the United States Patent and Trademark Office*